(12) United States Patent
Lee et al.

(10) Patent No.: US 11,872,513 B2
(45) Date of Patent: Jan. 16, 2024

(54) AIR CLEANER

(71) Applicant: SAMSUNG ELECTRONICS CO., LTD., Suwon-si (KR)

(72) Inventors: Young Seok Lee, Seoul (KR); Dah We Park, Seoul (KR); Ji Hyeoung Lee, Seoul (KR); Tim Rochford, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 165 days.

(21) Appl. No.: 16/326,552

(22) PCT Filed: Jun. 20, 2017

(86) PCT No.: PCT/KR2017/006460
§ 371 (c)(1),
(2) Date: Feb. 19, 2019

(87) PCT Pub. No.: WO2018/034419
PCT Pub. Date: Feb. 22, 2018

(65) Prior Publication Data
US 2019/0184324 A1 Jun. 20, 2019

(30) Foreign Application Priority Data
Aug. 19, 2016 (KR) .................. 10-2016-0105358

(51) Int. Cl.
*B01D 46/00* (2022.01)
*B01D 46/42* (2006.01)
(Continued)

(52) U.S. Cl.
CPC .......... *B01D 46/681* (2022.01); *B01D 46/00* (2013.01); *B01D 46/0047* (2013.01);
(Continued)

(58) Field of Classification Search
CPC .................... B01D 46/0047; B01D 46/00; B01D 46/0024; B01D 46/0065; B01D 46/42;
(Continued)

(56) References Cited

U.S. PATENT DOCUMENTS 5,264,015 A * 11/1993 Matsui .............. F24F 9/00
55/467
7,056,368 B2  6/2006 Moredock et al.
(Continued)

FOREIGN PATENT DOCUMENTS

CN   1629551 A   6/2005
CN   1651829 A   8/2005
(Continued)

OTHER PUBLICATIONS

European Office Action dated May 13, 2020 in European Patent Application No. 17841603.8.
(Continued)

*Primary Examiner* — Robert A Hopkins
*Assistant Examiner* — Qianping He
(74) *Attorney, Agent, or Firm* — STAAS & HALSEY LLP

(57) ABSTRACT

An operation mode of an air cleaner is changed according to the degree of indoor air contamination and an indoor space condition, and one or more filters of the air cleaner can be easily cleaned. The air cleaner includes a housing, an inlet located at a lower part of the housing, a filter assembly, an outlet, and a brush unit. The filter assembly is located above the inlet, and a diameter of the filter assembly is gradually shortened in the direction from an upper part of the filter assembly to a lower part of the filter assembly. The discharge port is located above a second filter assembly. The brush unit is used to eliminate contaminants from an outer surface of the filter assembly.

23 Claims, 14 Drawing Sheets

(51) Int. Cl.
  *B01D 46/44*   (2006.01)
  *B01D 46/52*   (2006.01)
  *F24F 1/0073*  (2019.01)
  *F24F 1/52*    (2011.01)
  *B01D 46/681*  (2022.01)
  *B01D 46/64*   (2022.01)
  *F24F 11/52*   (2018.01)

(52) U.S. Cl.
  CPC ......... *B01D 46/42* (2013.01); *B01D 46/4254* (2013.01); *B01D 46/44* (2013.01); *B01D 46/442* (2013.01); *B01D 46/52* (2013.01); *B01D 46/521* (2013.01); *B01D 46/64* (2022.01); *F24F 1/0073* (2019.02); *F24F 11/52* (2018.01); *B01D 2267/60* (2013.01); *B01D 2275/201* (2013.01); *B01D 2279/50* (2013.01)

(58) Field of Classification Search
  CPC .. B01D 46/4254; B01D 46/44; B01D 46/442; B01D 46/52; B01D 46/521; B01D 2267/60; B01D 2275/201; B01D 2279/50; F24F 11/52; F24F 11/0073
  USPC .......................................................... 96/418
  See application file for complete search history.

(56) References Cited

U.S. PATENT DOCUMENTS

| | | | |
|---|---|---|---|
| 7,998,231 | B2 | 8/2011 | Zheng et al. |
| 9,713,783 | B2 | 7/2017 | Yu et al. |
| 9,821,262 | B2 | 11/2017 | Park et al. |
| 11,161,072 | B2 | 11/2021 | Krisko et al. |
| 2004/0231515 | A1* | 11/2004 | Moredock ............ F02M 35/022 95/273 |
| 2006/0154596 | A1* | 7/2006 | Meneely, Jr. ........ F24F 11/0001 454/256 |
| 2007/0000221 | A1 | 1/2007 | Park et al. |
| 2010/0263536 | A1 | 10/2010 | Webb |
| 2010/0293907 | A1 | 11/2010 | Zheng et al. |
| 2016/0097187 | A1 | 4/2016 | Johnston et al. |
| 2018/0207568 | A1* | 7/2018 | Jung ..................... F24F 1/0071 |
| 2019/0184324 | A1 | 6/2019 | Lee et al. |

FOREIGN PATENT DOCUMENTS

| | | | |
|---|---|---|---|
| CN | 1781577 | A | 6/2006 |
| CN | 101109546 | A | 1/2008 |
| CN | 102059160 | A | 5/2011 |
| CN | 102162662 | A | 8/2011 |
| CN | 102829512 | A | 12/2012 |
| CN | 103017288 | A | 4/2013 |
| CN | 203132000 | U | 8/2013 |
| CN | 103982994 | A | 8/2014 |
| CN | 204084651 | U | 1/2015 |
| CN | 204084651 | U * | 1/2015 |
| CN | 204485528 | | 7/2015 |
| CN | 204648495 | | 9/2015 |
| CN | 105546664 | A | 5/2016 |
| CN | 105757957 | A | 7/2016 |
| CN | 106839139 | | 6/2017 |
| CN | 114061010 | A | 2/2022 |
| EP | 1611939 | | 1/2006 |
| EP | 2 837 897 | B1 | 3/2017 |
| GB | 505917 | | 5/1939 |
| GB | 2444609 | | 6/2008 |
| IT | 8421899 | A1 | 1/1986 |
| JP | 2007-147168 | A | 6/2004 |
| JP | 2007-237091 | | 9/2007 |
| JP | 2008-170121 | A | 7/2008 |
| JP | 2009-186058 | A | 8/2009 |
| JP | 2009-198158 | A | 9/2009 |
| JP | 2010-253477 | | 11/2010 |
| JP | 2013-57460 | A | 3/2013 |
| JP | 2013-217580 | | 10/2013 |
| JP | 2014119224 | A | 6/2014 |
| JP | 5676938 | | 2/2015 |
| KR | 97-59618 | | 8/1997 |
| KR | 10-2005-0010346 | | 1/2005 |
| KR | 10-2009-0003869 | A | 1/2009 |
| KR | 10-2009-0022854 | A | 3/2009 |
| KR | 10-2009-0098514 | | 9/2009 |
| KR | 20100062121 | A * | 6/2010 |
| KR | 10-1006820 | | 12/2010 |
| KR | 10-1572850 | | 11/2015 |
| KR | 10-2016-0012796 | | 2/2016 |
| KR | 10-2016-1177263 | | 7/2016 |
| KR | 10-1856979 | | 5/2018 |
| KR | 10-2019-0004114 | A | 1/2019 |
| KR | 10-2019-0059729 | A | 5/2019 |

OTHER PUBLICATIONS

Extended European Search Report dated Jul. 9, 2019 in European Patent Application No. 17841603.8.
European Communication under Rule 71(3) dated Dec. 4, 2020 in European Patent Application No. 17841603.8.
Chinese Office Action dated Jan. 20, 2021 in Chinese Patent Application No. 201780050790.6.
Indian Office Action dated Dec. 23, 2020 in Indian Patent Application No. 20197010283.
International Search Report dated Sep. 29, 2017 in corresponding International Application No. PCT/KR2017/006460.
Written Opinion of the International Searching Authority dated Sep. 29, 2017 in corresponding International Application No. PCT/KR2017/006460.
Extended European Search Report dated May 14, 2021 for European Application No. 21166443.8-1104.
European Office Action dated Feb. 8, 2022 in European Patent Application No. 21 166 443.8.
Chinese Office Action dated Oct. 8, 2022 in Chinese Patent Application No. 202111360921.5 (7 pages; 8 pages English translation).
European Office Action dated Oct. 14, 2022 in European Patent Application No. 21 166 443.8 (3 pages).
Office Action dated Feb. 1, 2023 in Chinese Patent Application No. 202210115632.7 (7 pages; 7 pages English translation).
Office Action dated Feb. 20, 2023 in Korean Patent Application No. 10-2016-0105358 (7 pages; 9 pages English translation).
Office Action dated Apr. 20, 2023 in Chinese Patent Application No. 202111360921.5 (3 pages; 3 pages English translation).
Chinese Offfice Action dated Aug. 12, 2021 in Chinese Patent Application No. 201780050790.6.
Notice of Allowance dated Aug. 31, 2023 in Chinese Patent Application No. 202111360921.5.
Office Action dated Aug. 28, 2023 in Indian Patent Application No. 201917010283.
Office Action dated Jul. 12, 2023 in European Patent Application No. 21 166 443.8.
Office Action dated Sep. 20, 2023 in Chinese Patent Application No. 202210115632.7.

\* cited by examiner

AIR CLEANER

CROSS-REFERENCE TO RELATED APPLICATIONS

This application is a National Phase application, under 35 U.S.C. § 371, of International Application No. PCT/KR2017/006460 filed Jun. 20, 2017, which claims Convention Priority to Korean patent application No. 10-2016-0105358 filed Aug. 19, 2016, the entire disclosures of which are herein incorporated by reference as a part of this application.

TECHNICAL FIELD

Embodiments of the present disclosure relate to an air cleaner having an improved structure.

BACKGROUND ART

An air cleaner is a device to remove contaminants in the air. The air cleaner may remove bacteria, viruses, mold, fine dust, and chemical substances causing foul odors from suctioned air.

The air cleaner may include a filter to purify polluted indoor air. The air suctioned into the air cleaner may pass through the filter such that contaminants are removed from the suctioned air, thus producing purified air. The purified air may be discharged outside from the air cleaner.

The air cleaner may be used in various spaces having different air-contamination levels. When the air cleaner is used in a high-air-contamination space, the air cleaner may operate at a high speed to more quickly purify indoor air. The air cleaner may operate at a low speed in an indoor space in which air contamination level is low and indoor quietness is needed.

The air cleaner may include different kinds of filters to remove various contaminants from the air. A pre-filter configured to filter out relatively large-sized dust in the air may be located at the foremost position of one or more filters.

Dust or contaminants in the air may be collected in each filter provided in the air cleaner. In order to efficiently perform air purification, there is a need to remove the dust or contaminants collected in the filter or replace the filter with a new filter.

DISCLOSURE

Technical Problem

It is an object of the present disclosure to provide an air cleaner for changing an operation mode thereof according to the degree of indoor air contamination and an indoor space condition.

It is another object of the present disclosure to provide an air cleaner for easily cleaning a filter.

Technical Solutions

The objects of the present disclosure can be achieved by an air cleaner including a housing, an inlet located at a lower part of the housing, a filter assembly located above the inlet, a diameter of which is gradually shortened in a direction from an upper part of the filter assembly to a lower part of the filter assembly, an outlet located above the second filter assembly, and a brush unit configured to remove or separate contaminants attached to an outer surface of the filter assembly from the filter assembly.

The filter assembly may include a first filter assembly and a second filter assembly located above the first filter assembly.

The air cleaner may further include a discharge member located above the filter assembly, and formed to have the outlet while movable in a vertical direction.

The discharge member may include a first outlet formed at a side surface of the discharge member, and a second outlet formed at a top surface of the discharge member.

The discharge member may operate in any one of a first discharge mode and a second discharge mode. In the first discharge mode, the first outlet may be inserted into the housing, and air may be discharged outside only through the second outlet. In the second discharge mode, the first outlet may be exposed outside the housing, and air may be discharged outside through the first outlet and the second outlet.

The air cleaner may further include a notification means contained in the housing, and configured to indicate whether air is currently discharged outside through the outlet.

The notification means may be implemented as a light or lamp configured to be movable.

The brush unit may be in contact with an outer surface of the filter assembly, and may be movable along the outer surface of the filter assembly.

The brush unit may include a brush part configured to be in contact with the outer surface of the filter assembly, and a coupling part connected to a driving source.

The air cleaner may further include a propeller rotatably mounted to one end of the filter assembly. The brush unit is connected to the propeller.

A blowing fan may be mounted to one side of the filter assembly so as to suction air, and the propeller may rotate by air current generated by rotation of the blowing fan.

A dust collection space may be formed in a portion of the housing. The filter assembly may be contained in the dust collection space. A portion of the housing in which the dust collection space is formed may be detachably coupled to the remaining portions of the housing.

The filter assembly may include a flow passage, one end of which is formed to communicate with an external part of the filter assembly.

When the filter assembly is contained in the dust collection space, the flow passage may be formed to communicate with the dust collection space, and another end of the flow passage may be configured to be opened or closed by a cap.

The filter assembly may be formed in a manner that a diameter of the filter assembly is gradually shortened in a direction from an upper part of the filter assembly to a lower part of the filter assembly.

In accordance with another aspect of the present disclosure, the air cleaner includes a case, a filter assembly, a second filter assembly, and a vibration generator. An inlet may be located at a lower part of the case, and an outlet may be located at an upper part of the case. The first filter assembly may be contained in the case, and may filter out contaminants from the suctioned air. The second filter assembly may be located above the first filter assembly, and may filter out contaminants from the air having passed through the first filter assembly. The vibration generator may vibrate any one of the first filter assembly and the second filter assembly.

The vibration generator may include a cam. At least a portion of an outer surface of the cam may be formed to protrude, and the cam may be movable.

The first filter assembly or the second filter assembly may include a bearing configured to be in contact with the cam.

A diameter of at least one of the first filter assembly and the second filter assembly may be gradually shortened in a downward direction.

In accordance with another aspect of the present disclosure, the air cleaner includes an inlet and an outlet. The inlet may be located at a lower part of the air cleaner, and the outlet may be located at an upper part of the air cleaner. The air cleaner includes a housing, a filter assembly, a brush unit, and a discharge member. A diameter of the filter assembly may be gradually shortened in a downward direction. The brush unit rotates at the outside of the filter assembly, and at the same time removes contaminants from the outer circumference of the filter assembly. The outlet may be formed in the discharge member. The discharge member may be located at an upper part of the housing, and may be movable in a vertical direction. The outlet may include a first outlet formed at a side surface of the discharge member so as to omnidirectinally discharge the air, and a second outlet formed at a top surface of the discharge member.

Advantageous Effects

As is apparent from the above description, the air cleaner according to the embodiments of the present disclosure may operate at a proper operation mode according to surroundings of an indoor space and the degree of indoor air contamination, such that the air cleaner can be easily used by users, resulting in greater convenience of use.

In addition, one or more filters can be easily and conveniently cleaned, such that efficiency deterioration of the air cleaner is prevented.

BEST MODE

Figure 1:
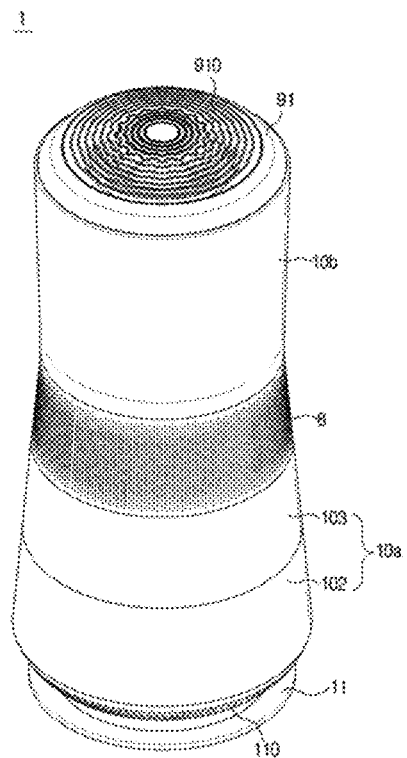
FIG. 1 is a perspective view illustrating an air cleaner according to an embodiment of the present disclosure.

Reference will now be made in detail to the embodiments of the present disclosure, examples of which are illustrated in the accompanying drawings, wherein like reference numerals refer to like elements throughout. An air cleaner according to the following embodiments of the present disclosure will hereinafter be described with reference to the attached drawings.

Figure 2:
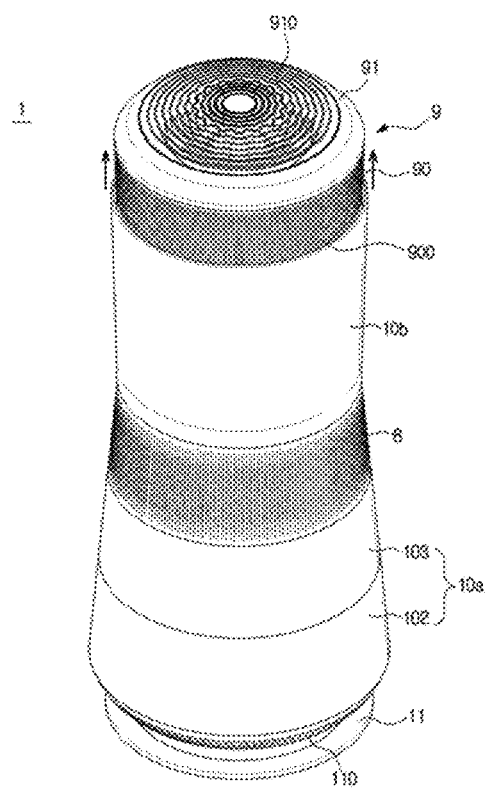
FIG. 2 is an elevation view illustrating a discharge member of an air cleaner according to an embodiment of the present disclosure.
Figure 3:
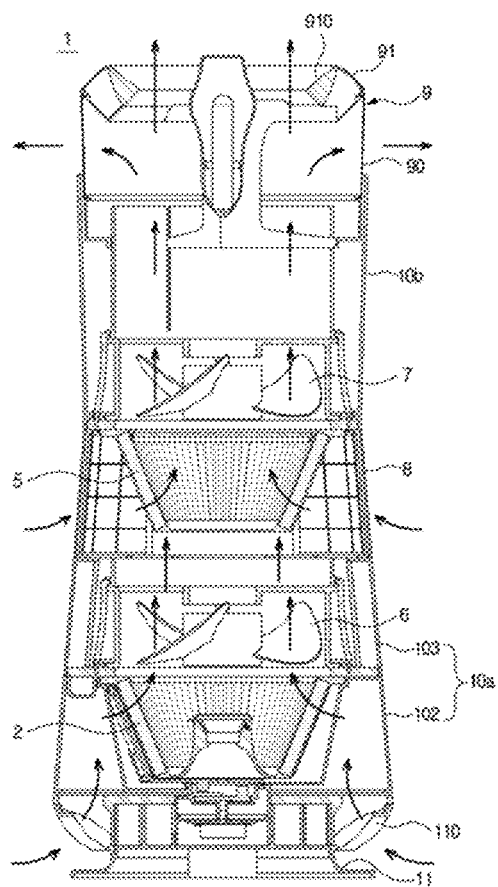
FIG. 3 is a view illustrating internal constituent elements of an air cleaner according to an embodiment of the present disclosure.
Figure 4:
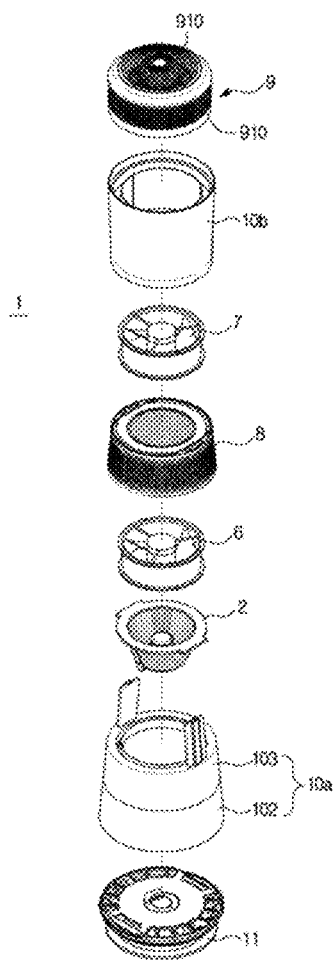
FIG. 4 is an exploded perspective view illustrating an air cleaner according to an embodiment of the present disclosure.

FIG. 1 is a perspective view illustrating an air cleaner according to an embodiment of the present disclosure. FIG. 2 is an elevation view illustrating a discharge member of the air cleaner. FIG. 3 is a view illustrating internal constituent elements of the air cleaner. FIG. 4 is an exploded perspective view illustrating the air cleaner.

Referring to FIGS. 1 to 4, the air cleaner 1 may be formed in a substantial cylindrical shape. The air cleaner 1 may include housings 10a and 10b forming the appearance thereof, and a plurality of assemblies 2 and 5. An exemplary embodiment in which two filter assemblies 2 and 5 are arranged in a vertical direction will hereinafter be described with reference to the attached drawings.

The filter assemblies 2 and 5 may include a first filter assembly 2 and a second filter assembly 5 located above the first filter assembly 2. The first filter assembly 2 may filter out relatively heavy contaminants in the air. The second filter assembly 5 may filter out relatively light contaminants in the air. For example, air including dust having a diameter of about 10 μm may pass through the filter assembly 2, such that the first filter assembly 2 may filter out the dust having a diameter of about 10 82 m. In addition, the air including dust having a diameter of about 2.5 μm may pass through the second filter assembly 5 such that the second filter assembly 5 may filter out the dust having a diameter of about 2.5 μm.

Each housing 10a or 10b may be formed in a substantially cylindrical shape. The housings 10a and 10b may include the first housing 10a to surround the first filter assembly 2 and a blowing fan 6, and the second housing 10b located above the first housing 10a. The first housing 10a may include a lower housing 102 and an upper housing 103 located over the lower housing 102. The lower housing 102 may include the first filter assembly 2, and the upper housing 103 may include the first blowing fan 6. The lower housing 102 including the first filter assembly 2 may be detachably coupled to the air cleaner 1. The user may separate the lower housing 102 from the air cleaner 1, such that the user may replace the first filter assembly 2 contained in the lower housing 102 with another filter assembly or may clean the first filter assembly 2.

A grille member 8 may be disposed between the first housing 10a and the second housing 10b. Outdoor air may be introduced into the air cleaner 1 through the grille member 8, such that relatively large dust or contaminants in the air may be filtered out. The air introduced into the air cleaner 1 through the grille member 7 may pass through the second filter assembly 5.

The air cleaner 1 may further include a base 11 seated on the ground. The first filter assembly 2 may be disposed over the base 11. An inlet 110 may be formed in the base 11. The air introduced into the air cleaner 1 through the inlet 110 may pass through the first filter assembly 2 so that contaminants in the introduced air can be filtered out.

The first blowing fan 6 may be disposed over the first filter assembly 2. The second filter assembly 5 may be disposed over the first blowing fan 6. A second blowing fan 7 may be disposed over the second filter assembly 5.

By rotation of the first blowing fan 6, the air may be introduced into the first filter assembly 2 through the inlet 110. By rotation of the second blowing fan 7, the air having passed through the first filter assembly 2 may be introduced into the second filter assembly 5, and may also be introduced into the second filter assembly 5 through the grille member 8. The first blowing fan 6 and the second blowing fan 7 may simultaneously operate, or only one of the first blowing fan 6 and the second blowing fan 7 may operate as necessary.

A discharge member 9 provided with outlets 900 and 910 may be disposed over the second housing 10*b* in a manner that purified air having no contaminants can be discharged outside through the outlets 900 and 910. The discharge member 9 may include a body 90, a first outlet 900 formed at a side surface of the body 90, and a second outlet 910 formed at a top surface 91 of the body 90.

The discharge member 9 may be formed in a shape corresponding to the shape of an inner surface of the second housing 10*b*. The first outlet 900 may be formed along a side surface of the discharge member 9 such that the air is discharged outside in a lateral or side direction. The air discharged through the first outlet 900 may form a distributed air flow of 360°.

The discharge member 9 may move upward and downward. When the discharge member 9 moves down, the first outlet 900 formed at the side surface of the body 90 may be inserted into the second housing 10*b*, and the air may be discharged outside through the second outlet 910 formed at the top surface 91. When the discharge member 9 moves upward, the first outlet 900 may be exposed outside, and the air may be discharged outside through the first outlet 900 and the second outlet 910.

When the contamination level of indoor air is low or the air cleaner 1 is set to a sleep mode, the discharge member 9 may be inserted into the second housing 10*b* and the air may be discharged outside only through the second outlet 910. When the air is discharged outside only through the second outlet 910, the speed of air purification may be reduced, resulting in reduction in noise caused by air discharge.

In this case, the first blowing fan 6 may not operate, and the second blowing fan 7 may operate. When the first blowing fan 6 operates, most indoor air may be introduced into the second filter assembly 5 through the grille member 8, such that the indoor air may be purified by the second filter assembly 5 and the purified air may be discharged outside through the second outlet 910. When necessary, the first blowing fan 6 may operate, and the second blowing fan 7 may not operate. In addition, the first blowing fan 6 and the second blowing fan 7 may simultaneously operate, and the air purified by the filter assemblies 2 and 5 may be intensively discharged in a vertical direction through the second outlet 910.

If the air cleaner 1 is set to a strong mode because the contamination level of indoor air is high or the indoor air needs to be quickly purified, the discharge member 9 may protrude from the second housing 10*b*, and the air may be rapidly discharged through the first outlet 900 and the second outlet 910. In this case, since the air is discharged through the first outlet 900 and the second outlet 910, noise caused by air discharge may unavoidably increase, but the air can be quickly purified within a short period of time.

In this case, the first blowing fan 6 and the second blowing fan 7 may simultaneously operate. The indoor air may be introduced into the air cleaner through the inlet 110 and the grille member 8, and may be purified by the first filter assembly 2 and the second filter assembly 5, such that the purified air may be discharged outside through the first outlet 900 and the second outlet 910. When necessary, it may also be possible to operate only one of the first blowing fan 6 and the second blowing fan 7.

The air cleaner 1 may operate in a plurality of operation modes. The operation mode of the air cleaner 1 may be automatically changed according to the contamination level of indoor air or the like, and the air cleaner 1 may also operate in a specific mode according to user setting information. Various embodiments of the operation modes of the air cleaner 1 will hereinafter be described in detail.

For example, the air cleaner 1 may operate in a first mode in which the second blowing fan 7 located at a higher position may operate at a low speed. The second blowing fan 7 may operate at a constant low speed. In this case, the discharge member 9 may be inserted into the second housing 10*b*, such that the purified air may be discharged only through the second outlet 910. The air may be discharged outside at a low speed through the second outlet 910, such that gentle flow of air having less noise may be discharged outside. The first mode may be mainly used at night or during bedtime.

The air cleaner 1 may operate in a second mode in which the second blowing fan 7 is automatically driven according to the contamination level of indoor air. When the second blowing fan 7 rotates at a low speed, the discharge member 9 may remain inserted into the second housing 10*b*, and the purified air may be discharged outside through the second outlet 910. When the rotation speed of the second blowing fan 7 gradually increases, the discharge member 9 may protrude outward from the second housing 10*b*, such that the purified air may be rapidly discharged through the first outlet 900 and the second outlet 910. In order to discharge the purified air through the second outlet 910 irrespective of the operation speed of the second blowing fan 7, the discharge member 9 may also remain inserted into the second housing 10*b*.

For example, the air cleaner 1 may mainly operate in the second mode in daytime in which most people are actively moving.

In order to rapidly purify the indoor air using the air cleaner 1, the air cleaner 1 may operate in a third mode in which the first blowing fan 6 and the second blowing fan 7 are simultaneously driven. In this case, the discharge member 9 may protrude outward from the second housing 10*b*, and the purified air may be rapidly discharged outside through the first outlet 900 and the second outlet 910. When the contamination level of indoor air is very high or when many people are present in a limited-sized space, the air cleaner 1 may operate in the third mode. In the third mode, the air cleaner 1 may rapidly purify the indoor air at a maximum air speed and a maximum air volume.

The air cleaner 1 may operate in a fourth mode in which the first blowing fan 6 and the second blowing fan 7 operate at different speeds. For example, the first blowing fan 6 may rotate at a higher speed, and the second blowing fan 7 may rotate at a lower speed than the first blowing fan 6. The discharge member 9 may remain inserted into the second housing 10*b*, and the purified air may be discharged outside through the second outlet 910. In the fourth mode, the air cleaner 1 may mainly operate for circulation or deodorization of the indoor air.

The scope or spirit of the operation mode of the air cleaner 1 is not limited to the above-mentioned first to fourth modes.

Figure 5:
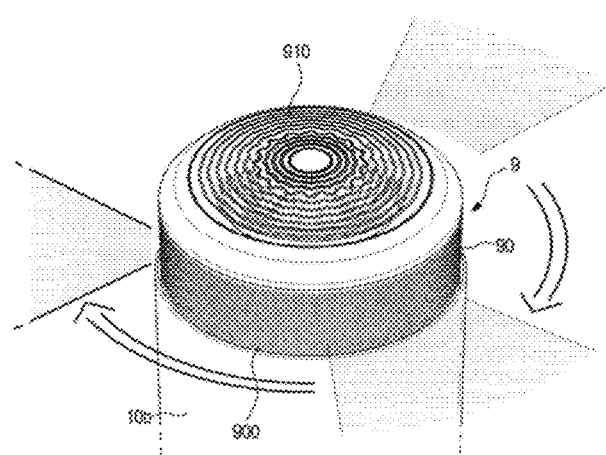
FIG. 5 is a view illustrating some portions of an air cleaner according to an embodiment of the present disclosure.

FIG. 5 is a view illustrating some portions of the air cleaner according to an embodiment of the present disclosure.

The air cleaner 1 shown in FIG. 5 may include a notification means capable of intuitively informing the user of the operation states of the air cleaner 1. The notification means may be implemented as a light or lamp. For example, in order to indicate that the air is omnidirectionally discharged through the second outlet 910 under the condition that the air is discharged outside through the first outlet 900 and the second outlet 910 by upward movement of the discharge member 9, the light may rotate at 360° in the vicinity of the second outlet 910, such that the light may emit light in sequence.

In addition, the rotation speed of the light may be changeable with the rotation speed of each blowing fan 6 or 7. When each of the blowing fans 6 and 7 rotates at a low speed, the light may rotate at a low speed. When each of the blowing fans 6 and 7 rotates at a high speed, the light may also rotate at a high speed.

In addition, color of the light may also be changed according to the contamination level of indoor air. The contamination level of indoor air may be measured by a sensor located in the air cleaner 1. When the contamination level of indoor air is very high, the light blinks in red. As the contamination level of indoor air is gradually reduced, the light sequentially blinks in the order of orange • yellow • green • blue • purple.

Figure 6:
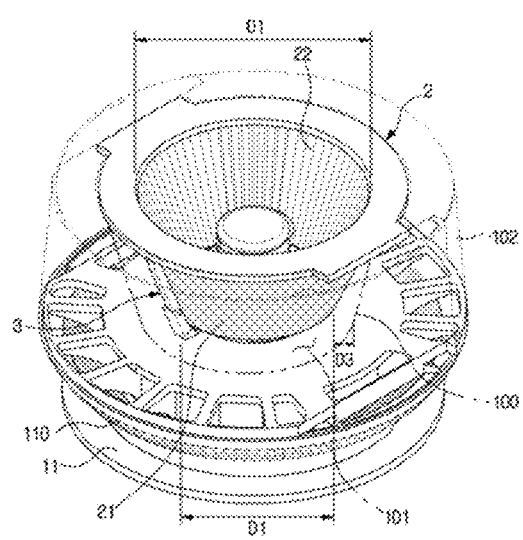
FIG. 6 is a view illustrating a first filter assembly provided with a brush unit according to an embodiment of the present disclosure.
Figure 7:
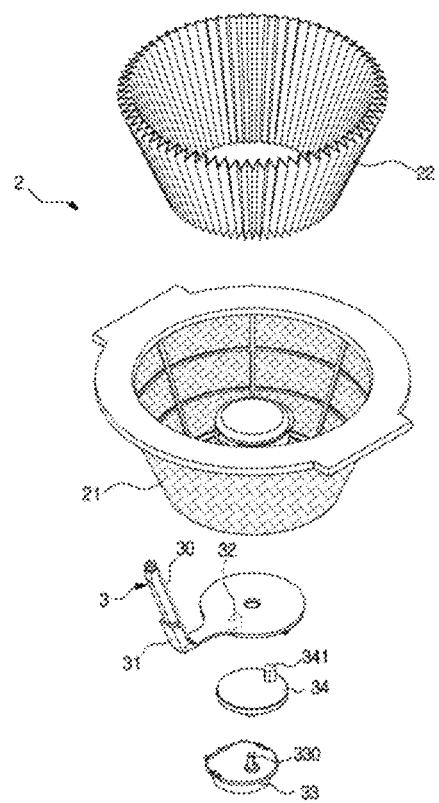
FIG. 7 is an exploded perspective view illustrating a first filter assembly provided with a brush unit according to an embodiment of the present disclosure.
Figure 8:
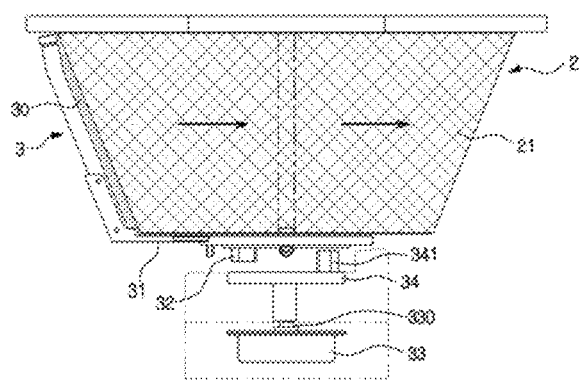
FIG. 8 is a view illustrating some portions of a first filter assembly provided with a brush unit according to an embodiment of the present disclosure.

FIG. 6 is a view illustrating a first filter assembly provided with a brush unit. FIG. 7 is an exploded perspective view illustrating the first filter assembly provided with the brush unit. FIG. 8 is a view illustrating some portions of the first filter assembly provided with the brush unit.

Referring to FIGS. 6 to 8, a diameter of the first filter assembly 2 may be gradually shortened in a downward direction of the first filter assembly 2. For example, the first filter assembly 2 may be formed to have a substantially conical shape or a substantially circular truncated conical shape. When the first filter assembly 2 is formed to have a circular truncated conical shape, a diameter D1 of one end of the first filter assembly 2 may be longer than a diameter D2 of the other end of the first filter assembly 2. One end of the first filter assembly 2 may be disposed at an upper part of the first filter assembly 2, and the other end of the first filter assembly 2 may be disposed at a lower part of the first filter assembly 2. In the first filter assembly 2, one end having a longer diameter D1 may be located at a higher position than the other end having a shorter diameter D2.

As described above, the first filter assembly 2 is formed to have a conical shape or a circular truncated conical shape, such that the first filter assembly 2 formed either in the conical shape or in the circular truncated conical shape may have a larger surface area than the other filter assembly formed in a cylindrical shape on the assumption that the first filter assembly 2 and the other first filter assembly are formed to have the same diameter. Therefore, the air suctioned through the inlet 110 may more easily pass through the first filter assembly 2 having a larger surface area, resulting in improved air purification efficiency.

In comparison with the other filter assembly formed in a plate shape on the assumption that the same diameter is used, the first filter assembly 2 formed either in a conical shape or in a circular truncated conical shape may have a larger surface area. As described above, the first filter assembly 2 may be formed to have a larger surface area, resulting in higher air purification efficiency.

The first filter assembly 2 may include a pre-filter 21 and a High Efficiency Particulate Air (HEPA) filter 22. The pre-filter 21 may be formed in conical shape or in a circular truncated conical shape. The HEPA filter 22 may be formed in a shape corresponding to the inner surface of the pre-filter 21, and may be included in the pre-filter 21.

A brush unit 3 may be provided at the side of the first filter assembly 2. The brush unit 3 may be in contact with the outer surface of the pre-filter 21. The brush unit 3 may rotate around the pre-filter 21 such that contaminants attached to the surface of the pre-filter 21 can be separated from the pre-filter 21.

The brush unit 3 may include a brush part 30 and a coupling part 31. The brush part 30 may be in contact with the outer surface of the pre-filter 21 so that contaminants attached to the surface of the pre-filter 21 can be dropped or separated from the pre-filter 21. The coupling part 31 may be connected to the brush part 30 such that the coupling part 31 may receive driving power from a driver 33. In this case, the driver 33 may be implemented as a motor.

The brush part 30 may rotate while in contact with the surface of the pre-filter 21, such that contaminants attached to the surface of the pre-filter 21 can be dropped or separated. The coupling part 31 may rotate the brush part 30 upon receiving driving power from the driver 33. One end of the coupling part 31 may be connected to the brush part 30, and the other end of the coupling part 31 may be connected to the driver 33.

The coupling part 31 may be connected to the driver 33 through a transfer member 34. The transfer member 34 may include a rotation plate 340 connected to a rotation shaft 33 contained in the driver 33, and a first interference protrusion 341 protruding from one surface of the rotation plate 340. The first interference protrusion 341 may be located to be eccentric from the rotation shaft 330 such that the first interference protrusion 341 is not located at the same shaft as the rotation shaft 330. A second interference protrusion 32 interfered with by the first interference protrusion 341 may be provided to one side of the coupling part 31. The second interference protrusion 32 may not be located at the same shaft as the rotation shaft 330.

If the rotation plate 340 is rotated by the driver 33, the first interference protrusion 341 may rotate around the rotation shaft 330. When the first interference protrusion 341 touches the second interference protrusion 32, the first interference protrusion 341 may rotate together with the second interference protrusion 32. As a result, the coupling part 31 and the brush part 30 connected to the coupling part 31 may simultaneously rotate.

An outer side of the first filter assembly 2 may be surrounded by an inner wall 100. A dust collection space 101 formed by the inner wall 100 may be formed in the lower housing 102, and the first filter assembly 2 may be included in the dust collection space 101. The inner wall 100 may be integrally formed with the lower housing 102. The inner wall 100 may be formed in a cylindrical shape. Therefore, a diameter D3 between the first filter assembly 2 and the inner wall 100 may gradually increase in length in a downward direction of the first filter assembly 2.

The dust collection space 101 may be disposed between the inner wall 100 and the first filter assembly 2, such that dust or contaminants filtered out by the pre-filter 21 may drop from the surface of the pre-filter 21 and be collected in the dust collection space 101. The dust or contaminants separated from the surface of the pre-filter 21 may be collected in the dust collection space 101 by the brush part 30.

The brush unit 3 may be controlled to periodically clean the pre-filter 21. For example, when the air cleaner 1 is turned on, the air cleaner 1 may perform air purification after removing contaminants from the pre-filter 21 via the brush unit 3. Even in the air purification operation, when the amount of contaminants filtered out by the pre-filter 21 is equal to or larger than a preset reference amount of contaminants, or whenever a predetermined time elapses after starting the air cleaner 1, contaminants attached to the pre-filter 21 may be removed from the pre-filter 21 by the brush unit 3.

Contaminants may be removed from the pre-filter 21 by the brush unit 3, such that suction force of the air can be prevented from being reduced. In addition, air purification efficiency of indoor air can also be prevented from being degraded.

The lower housing 102 may be detachably coupled to the first filter assembly 2, such that the lower housing 102 may be separated from the first filter assembly 2 as necessary. As a result, the user may separate the lower housing 102 from the first filter assembly 2, and may then discard the dust or contaminants collected in the dust collection space 101, such that the air cleaner 1 can be sanitarily managed by the user.

Figure 9A:
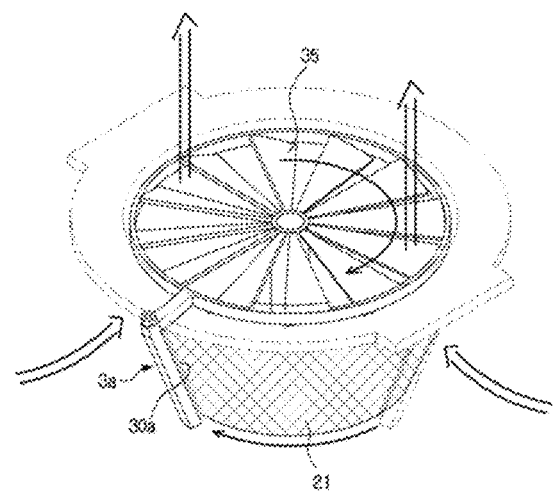
FIGS. 9A and 9B are views illustrating some portions of a first filter assembly provided with a brush unit according to another embodiment of the present disclosure.
Figure 9B:
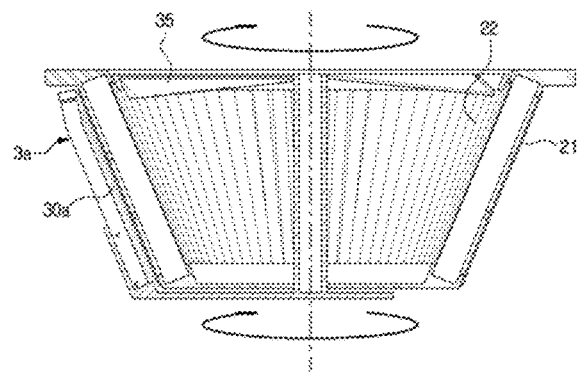

FIGS. 9A and 9B are views illustrating some portions of a first filter assembly provided with a brush unit according to another embodiment of the present disclosure.

Referring to FIGS. 9A and 9B, a brush unit 3a according to another embodiment may be connected to a propeller 35 uncoupled from a driving source. The propeller 35 may rotate without power. The propeller 35 may be disposed between the first filter assembly 2 and the first blowing fan 6. By rotation of the first blowing fan 6, the propeller 35 may rotate by air suctioned through an inlet 110.

As illustrated in FIG. 9A, an upper end of the brush unit 3a may be connected to the propeller 35. As illustrated in FIG. 9B, the brush unit 3a may be connected to the propeller 35.

The brush unit 3a may include a brush part 30a connected to the propeller 35. The brush part 30a may remain in contact with the outer wall of the first filter assembly 2 (i.e., the outer wall of the pre-filter 21). One end of the brush unit 3a may be connected to the propeller 35. The brush unit 3a may rotate together with the propeller 35. By rotation of the brush unit 3a, contaminants attached to the outer wall of the pre-filter 21 may be removed by the brush part 30a. Contaminants removed from the pre-filter 21 by the brush part 30a may be collected in the dust collection space 101 shown in FIG. 6.

The propeller 35 may be installed to rotate only when the first blowing fan 6 rotates at a preset rotation speed or higher. Therefore, the propeller 35 rotates such that contaminants attached to the pre-filter 21 can be removed by the brush part 30a only when the first blowing fan 6 rotates at a high speed (for example, when indoor air needs to be rapidly purified or when the contamination level of indoor air is very high).

If the rotation speed of the first blowing fan 6 is high, it is expected that the amount of air, that is scheduled to pass through the pre-filter 21 per unit time, increases and the amount of contaminants filtered out by the pre-filter 21 also increases in proportion to the amount of air. The air cleaner 1 according to this embodiment is configured to remove contaminants attached to the pre-filter 21 using the brush part 30a, such that the air cleaner 1 can be easily and efficiently managed by the user.

In addition, when the brush unit 3a is installed to rotate together with the propeller 35, the brush unit 3a can rotate without power such that the amount of power consumed by the air cleaner 1 can be greatly reduced.

Although the above-mentioned embodiment has disclosed the exemplary case in which the brush unit 3a is mounted to the propeller 35 that is capable of rotating without power for convenience of description and better understanding of the present disclosure, the scope or spirit of the present disclosure is not limited thereto, and it should be noted that the brush unit 3a may also rotate while coupled to the first blowing fan 6 as necessary. In this case, a gear ratio of a gear by which the brush unit 3a is connected to the first blowing fan 6 may be controlled or adjusted in a manner that the brush unit 3a rotates at a lower speed than the first blowing fan 6. In addition, the brush unit 3a may also be connected to a torque limiter in a manner that the brush unit 3a can be prevented from rotating at a predetermined speed or higher. The scope or spirit of such connection between the brush unit 3a and the first blowing fan 6 is not limited to the above-mentioned structure.

Figure 10:
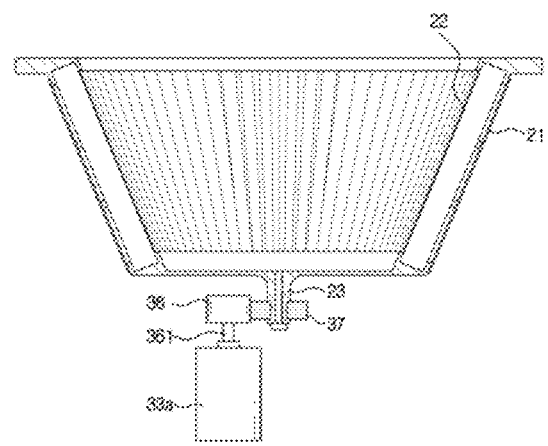
FIGS. 10 and 11 are views illustrating a first filter assembly according to another embodiment of the present disclosure.
Figure 11:
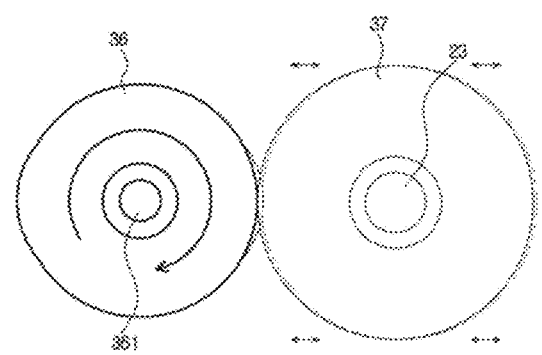

FIGS. 10 and 11 are views illustrating a first filter assembly according to another embodiment of the present disclosure.

Referring to FIGS. 10 and 11, the first filter assembly 2 according to another embodiment may vibrate upon receiving driving power. when the first filter assembly 2 vibrates, contaminants attached to the pre-filter 21 may be dropped or separated from the pre-filter 21. Contaminants separated from the pre-filter 21 may be collected in the dust reception space 101.

A shaft 23 extended downward may be provided to the first filter assembly 2, and a ring-shaped bearing 37 may be mounted to the shaft 23. The bearing 37 may be in contact with a cam 36 connected to the driving source 33a. The cam 36 may be connected to the driving source 33a through the rotation shaft 31.

Uneven parts may be formed in at least a portion of the outer surface of the cam 36. At least a portion of the outer surface of the cam 36 may be formed in an irregular shape, or a cross-sectional view of the cam 36 may not be formed in a smooth circular shape. For example, the cross-sectional view of the cam 36 may be formed in an oval shape. The scope or spirit of the shape of the cam 36 is not limited thereto, and the cam 36 may also be formed in an irregular shape.

If the cam 36 rotates by driving power of the driving source 33a, the bearing 37 is pushed laterally and then moves back to an original position thereof due to the shape of the cam 36. In this case, the first filter assembly 2 may move together with the bearing 37. When the cam 36 continues to rotate, the bearing 37 and the first filter assembly 2 are pushed laterally and then move back to original positions thereof such that such pushing and backward movement of the first filter assembly 2 may be repeatedly performed, resulting in vibration of the first filter assembly 2. When the first filter assembly 2 vibrates, contaminants attached to the pre-filter 21 may be dropped or removed from the pre-filter 21. The contaminants removed from the pre-filter 21 may be collected in the dust collection space 101.

The cam 36 may be installed to periodically rotate. After the air cleaner 1 is turned on, when the amount of contaminants filtered out by the pre-filter 21 is equal to or larger than a preset reference amount of contaminants, or whenever a predetermined time elapses during operation of the air cleaner 1, the cam 36 may rotate for a predetermined time. Contaminants attached to the pre-filter 21 may be periodically removed by periodic rotation of the cam 37, such that air suction force can be prevented from being deteriorated.

Figure 12:
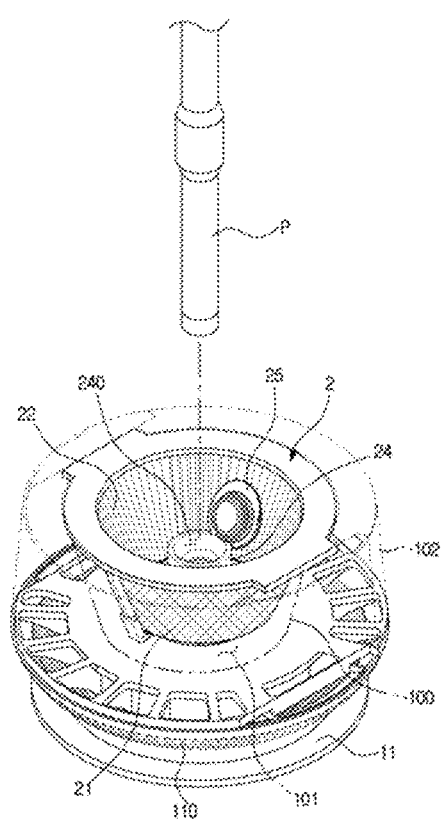
FIG. 12 is a view illustrating a first filter assembly according to an embodiment of the present disclosure.

FIG. 12 is a view illustrating a first filter assembly according to an embodiment of the present disclosure.

Referring to FIG. 12, the first filter assembly 2 may include a flow passage 24 formed to communicate with an external part of the first filter assembly 2, and a cap 25 formed to open or close the flow passage 24. When the first filter assembly 2 is included in the lower housing 102, the flow passage 24 may be formed to communicate with the dust reception space 101.

The flow passage 24 may be formed in a pipe shape having a predetermined length, such that the flow passage 24 may be extended in a vertical direction within the inner space of the first filter assembly 2. One end of the flow passage 24 may be located in the first filter assembly 2, and the other end of the flow passage 24 may communicate with the dust collection space 101 indicating the outer space of the first filter assembly 2. During operation of the air cleaner 1, the end part of the flow passage 24 may be blocked by the cap 25 in a manner that the air suctioned into the first filter assembly 2 is prevented from flowing through an inner space 240 of the flow passage 24.

When contaminants collected in the dust collection space 101 are removed, the user may open the cap 25 and may connect a connection pipe P of a vacuum cleaner (not shown) to the flow passage 24. When the vacuum cleaner is driven on the condition that the connection pipe P is connected to the flow passage 24, contaminants collected in the dust collection space 101 may be suctioned into the vacuum cleaner. As a result, the user may easily and conveniently remove contaminants collected in the dust collection space 101.

Figure 13:
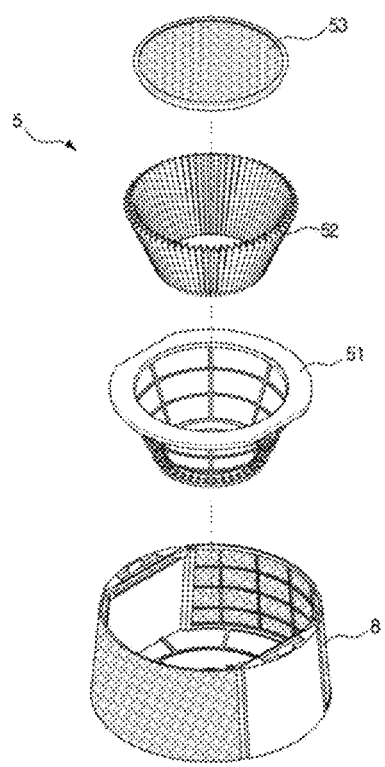
FIG. 13 is a view illustrating a second filter assembly according to an embodiment of the present disclosure.

FIG. 13 is a view illustrating a second filter assembly according to an embodiment of the present disclosure.

Referring to FIG. 13, a diameter of the second filter assembly 5 may be gradually shortened in a downward direction of the second filter assembly 5 in a similar way to the first filter assembly 2. For example, the second filter assembly 5 may be formed to have a substantially conical shape or a substantially circular truncated conical shape. The second filter assembly 5 may be located in the grille member 8. The second filter assembly 5 may include a filter frame 51 and a HEPA filter 52 contained in the filter frame 51. The HEPA filter 52 may be formed in a conical shape or in a circular truncated conical shape. The filter frame 51 may also be formed in a conical shape or in a circular truncated conical shape.

The filter frame 51 and the HEPA filter 52 may be installed in a manner that the diameters of the filter frame 51 and the HEPA filter 52 are located at an upper part of the second filter assembly 5. A carbon filter 53 may be located over the HEPA filter 52. The carbon filter 53 may be formed to have a flat surface, such that the carbon filter 53 may be seated on the filter frame 51.

The air suctioned through the inlet 110 may pass through the first filter assembly 2, and may then pass through the second filter assembly 5. In addition, the air introduced through the grille member 8 may also pass through the second filter assembly 5. In this case, the grille member 8 may be used as a pre-filter. That is, the air from which relatively large dust or contaminants are filtered out by the grille member 8 may pass through the second filter assembly 5. Contaminants are removed from the air having passed through the second filter assembly 5, such that purified air having no contaminants may be discharged through the outlets 900 and 910.

Although the above-mentioned example has disclosed the embodiment in which the first filter assembly and the second filter assembly are different in structure from each other for convenience of description and better understanding of the present disclosure, the scope or spirit of the present disclosure is not limited thereto, and the second filter assembly may also be formed to have the same structure as the first filter assembly. In addition, the second filter assembly may also include a brush unit or a structure for vibrating the second filter assembly as necessary.

The invention claimed is:

1. An air cleaner comprising:
a first inlet at a lower portion of the air cleaner;
a first filter assembly at the lower portion of the air cleaner;
a sensor to sense a contamination level of indoor air;
a first fan, above the first filter assembly, the first fan being rotated based on the contamination level of indoor air sensed by the sensor being equal to or higher than a value and being rotated based on the contamination level of indoor air sensed by the sensor being lower than the value to move air drawn from the first inlet in a vertical direction;
a first outlet formed to face in a lateral direction of the air cleaner;
a second inlet at a portion of the air cleaner above the first fan;
a second filter assembly at the portion of the air cleaner above the first fan;
a second fan, above the second filter assembly, the second fan being rotated based on the contamination level of indoor air sensed by the sensor being equal to or higher than the value to move air drawn from the second inlet in the vertical direction toward an upper portion of the air cleaner, and the second fan not being rotated based on the contamination level of indoor air sensed by the sensor being lower than the value;
a second outlet formed to face in the vertical direction of the air cleaner;
a discharge member including the second outlet and configured to move relative to the upper portion of the air cleaner such that the second outlet is movable between a first position and a second position,
wherein the air cleaner operates in one of a first discharge mode and a second discharge mode and controls a direction of air discharged from the air cleaner whereby:
in the first discharge mode, the second outlet is at the first position and the second fan is not rotated based on the contamination level of indoor air sensed by the sensor being lower than the value, and
in the second discharge mode, the second outlet is at the second position, different from the first position and protruding upward from the first position, based on the contamination level of indoor air sensed by the sensor being higher than the value,
wherein, in the second discharge mode, both the first fan and the second fan are rotated and the air drawn into the air cleaner is discharged through both the first outlet and the second outlet.

2. The air cleaner of claim 1, further comprising a housing having a cross section in a circular shape.

3. The air cleaner of claim 1, further comprising a housing in a cylindrical shape, and
wherein the first outlet is configured to discharge air in an annular lateral direction with respect to the housing.

4. The air cleaner of claim 3, wherein the first inlet has a cylindrical shape corresponding to the cylindrical shape of the housing.

5. The air cleaner of claim 4, wherein the first outlet is provided in a ring shape.

6. The air cleaner of claim 3, wherein the first outlet has a cylindrical shape corresponding to the cylindrical shape of the housing.

7. The air cleaner of claim 6, wherein the first outlet is provided in a ring shape along at least a portion of a side surface of the housing of the air cleaner.

8. The air cleaner of claim 1, wherein the first fan or the second fan has a rotational axis formed in an upper and a lower side of the air cleaner.

9. The air cleaner of claim 8, wherein the first outlet is provided to allow the air from inside the air cleaner to be discharged in a radial direction of the rotational axis.

10. The air cleaner of claim 1, wherein the first fan and the second fan are provided to rotate about a same rotational axis.

11. The air cleaner of claim 1,
wherein the discharge member is configured to control the direction of air discharged though the upper portion of the air cleaner.

12. The air cleaner of claim 1, wherein the second outlet is caused to be positioned at the second position in response to the contamination level of indoor air being sensed as being high by the sensor.

13. The air cleaner of claim 1, wherein the air cleaner includes a notification light changeable according to the contamination level of indoor air which is measured by the sensor which is located in the air cleaner.

14. The air cleaner of claim 13, wherein the notification light is shown in red when the contamination level of indoor air is high.

15. The air cleaner of claim 14, wherein the notification light is sequentially shown in an order of orange, green, blue as the contamination level of indoor air is reduced.

16. The air cleaner of claim 15, wherein the first fan and the second fan operate at different speeds.

17. The air cleaner of claim 16, wherein the second fan operates at a lower speed than the first fan and the air is discharged in the vertical direction through the second outlet.

18. An air cleaner comprising:
a first inlet located at a lower part of the air cleaner;
a first filter assembly at the lower part of the air cleaner where the first inlet is located;
a sensor to sense a contamination level of indoor air;
a first fan, above the first filter assembly, the first fan being rotated based on the contamination level of indoor air sensed by the sensor being equal to or higher than a value and being rotated based on the contamination level of indoor air sensed by the sensor being lower than the value to move air drawn from the first inlet in a vertical direction;
a first outlet through which air is discharged in a lateral direction of the air cleaner;
a second filter assembly above the first fan;
a second inlet formed at least at a portion of a side surface of the air cleaner;
a second fan, above the second filter assembly, the second fan being rotated based on the contamination level of indoor air sensed by the sensor is being equal to or higher than the value to move air drawn from the second inlet in the vertical direction toward an upper portion of the air cleaner, and the second fan not being rotated based on the contamination level of indoor air sensed by the sensor being lower than the value;
a second outlet through which air is discharged in the vertical direction toward the upper portion of the air cleaner;
a discharge member including the second outlet and configured to move relative to the upper portion of the air cleaner such that the second outlet is movable between a first position and a second position,
wherein the air cleaner operates in one of a first discharge mode and a second discharge mode and controls a direction of air discharged from the air cleaner whereby:
in the first discharge mode, the second outlet is at the first position and the second fan is not rotated based on the contamination level of indoor air sensed by the sensor being lower than the value, and
in the second discharge mode, the second outlet is at the second position, different from the first position and protruding upward from the first position, based on the contamination level of indoor air sensed by the sensor being higher than the value,
wherein, in the second discharge mode, both the first fan and the second fan are rotated and the air drawn into the air cleaner is discharged through both the first outlet and the second outlet.

19. The air cleaner of claim 18,
wherein the discharge member is configured to control the direction of air discharged though the upper portion of the air cleaner.

20. The air cleaner of claim 18, wherein the air cleaner includes a notification light changeable according to the contamination level of indoor air which is measured by the sensor which is located in the air cleaner.

21. An air cleaner comprising:
a first inlet located at a lower part of the air cleaner;
a first filter assembly at the lower part of the air cleaner where the first inlet is located;
a sensor to sense at least a degree of indoor air contamination, data resulting from sensing by the sensor being used to provide an indicator corresponding to the degree of indoor air contamination;
a first fan, above the first filter assembly, the first fan being rotated based on the degree of indoor air contamination sensed by the sensor being equal to or higher than a value and being rotated based on the degree of indoor air contamination sensed by the sensor being lower than the value to move air from the first inlet to pass through the first filter assembly and flow along a vertical direction;
a first outlet through which air is discharged along a lateral direction of the air cleaner;
a second filter assembly above the first fan;
a second inlet formed at least at a portion of a side surface of the air cleaner;
a second fan, above the second filter assembly, the second fan being rotated based on the degree of indoor air contamination sensed by the sensor being equal to or higher than the value to move air from the second inlet to pass through the second filter assembly and flow along a direction toward an upper portion of the air cleaner, and the second fan not being rotated based on the degree of indoor air contamination sensed by the sensor being lower than the value; and
a second outlet through which air is discharged along the direction toward the upper portion of the air cleaner and a discharge member including the second outlet and configured to move relative to the upper portion of the air cleaner such that the second outlet is movable between a first position and a second position, wherein the air cleaner operates in one of a first discharge mode and a second discharge mode and controls a direction of air discharged from the air cleaner whereby:

in the first discharge mode, the second outlet is at the first position and the second fan is not rotated based on the degree of indoor air contamination sensed by the sensor being lower than the value, and in the second discharge mode, the second outlet is at the second position, different from the first position and protruding upward from the first position, based on the degree of indoor air contamination sensed by the sensor being higher than the value, wherein, in the second discharge mode, both the first fan and the second fan are rotated and the air drawn into the air cleaner is discharged through both the first outlet and the second outlet.

22. The air cleaner of claim 21, wherein the indicator corresponding to the degree of indoor air contamination is shown in color which changes as the degree of indoor air contamination increases or decreases.

23. The air cleaner of claim 21, wherein the indicator corresponding to the degree of indoor air contamination is shown in color which changes in an order of red, orange, green and blue depending on the degree of indoor air contamination sensed by the sensor.

* * * * *